(12) United States Patent
Kim et al.

(10) Patent No.: US 12,437,189 B2
(45) Date of Patent: Oct. 7, 2025

(54) ENCODER AND OPERATION METHOD THEREOF

(71) Applicant: Electronics and Telecommunications Research Institute, Daejeon (KR)

(72) Inventors: Sung Eun Kim, Daejeon (KR); Tae Wook Kang, Daejeon (KR); Hyuk Kim, Daejeon (KR); Young Hwan Bae, Daejeon (KR); Kyung Jin Byun, Daejeon (KR); Kwang Il Oh, Daejeon (KR); Jae-Jin Lee, Daejeon (KR); In San Jeon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 658 days.

(21) Appl. No.: 17/895,532

(22) Filed: Aug. 25, 2022

(65) Prior Publication Data

US 2023/0068675 A1 Mar. 2, 2023

(30) Foreign Application Priority Data

Aug. 26, 2021 (KR) .......................... 10-2021-0113270
Mar. 2, 2022 (KR) .......................... 10-2022-0026567

(51) Int. Cl.
*G06N 3/065* (2023.01)
*G06N 3/049* (2023.01)

(52) U.S. Cl.
CPC .............. *G06N 3/065* (2023.01); *G06N 3/049* (2013.01)

(58) Field of Classification Search
CPC ....................................................... G06N 3/065
USPC ............................................................. 706/15
See application file for complete search history.

(56) References Cited

U.S. PATENT DOCUMENTS

| 4,926,064 | A | * | 5/1990 | Tapang | .................. G06N 3/065 706/26 |
|---|---|---|---|---|---|
| 9,566,174 | B1 | * | 2/2017 | De Sapio | .................. A61F 2/54 |
| 10,277,122 | B1 | * | 4/2019 | Wang | ...................... H02M 3/07 |
| 10,438,116 | B2 | * | 10/2019 | Oh | ............................ G06F 7/68 |
| 10,523,220 | B1 | * | 12/2019 | Ru | ....................... G11C 29/028 |
| 10,623,007 | B1 | * | 4/2020 | Kong | .................... H03L 7/0895 |
| 11,439,810 | B2 | * | 9/2022 | Cruttenden | .......... A61N 1/0551 |

(Continued)

FOREIGN PATENT DOCUMENTS

| KR | 10-1512370 | 4/2015 |
|---|---|---|
| KR | 10-2016-0136364 | 11/2016 |
| KR | 10-2018-0077148 | 7/2018 |

*Primary Examiner* — Reza Nabi
(74) *Attorney, Agent, or Firm* — KILE PARK REED & HOUTTEMAN PLLC (57) ABSTRACT

Disclosed is an encoder including event layer outputs first and second event signals, weight layer applies first and second weights to the first and second event signals respectively, and provides the first event signal in which the first weight is applied and the second event signal in which the second weight is applied to first node, and first spike generation circuit generates first input spike signal of which firing period is changed based on voltage level of the first node. The voltage level of the first node is reduced continuously, increases for first voltage corresponding to the first weight in response to the first event signal activated, and increases for second voltage corresponding to the second weight in response to the second event signal activated.

19 Claims, 10 Drawing Sheets

(56) References Cited

U.S. PATENT DOCUMENTS

| | | | |
|---|---|---|---|
| 2009/0015455 A1* | 1/2009 | Oshima | H03M 1/0673 |
| | | | 341/172 |
| 2014/0074761 A1* | 3/2014 | Hunzinger | G06N 3/049 |
| | | | 706/15 |
| 2015/0269485 A1* | 9/2015 | Julian | G06N 3/049 |
| | | | 706/25 |
| 2018/0357527 A1* | 12/2018 | Benosman | G06N 3/049 |
| 2019/0171933 A1* | 6/2019 | Lee | G06N 3/065 |
| 2019/0213472 A1* | 7/2019 | Park | G06N 3/088 |
| 2019/0294952 A1* | 9/2019 | Eleftheriou | G06N 3/065 |
| 2019/0332459 A1* | 10/2019 | Schie | G06N 3/048 |
| 2020/0014352 A1* | 1/2020 | Kim | H03G 1/0029 |
| 2020/0125935 A1* | 4/2020 | Kurokawa | G06F 7/5443 |
| 2020/0302279 A1* | 9/2020 | Yu | G11C 7/1006 |
| 2020/0346014 A1* | 11/2020 | Boor | A61N 1/36192 |
| 2020/0352520 A1* | 11/2020 | Lei | A61B 5/40 |
| 2021/0004669 A1* | 1/2021 | Serb | G06N 3/065 |
| 2021/0012909 A1* | 1/2021 | Koh | G16H 40/63 |
| 2021/0232905 A1* | 7/2021 | Dalgaty | G06N 3/063 |
| 2021/0366590 A1* | 11/2021 | Soh | G06N 7/01 |
| 2021/0383192 A1* | 12/2021 | Oh | G06N 3/049 |
| 2022/0253673 A1* | 8/2022 | Oh | G06N 3/063 |
| 2022/0391669 A1* | 12/2022 | Oh | G06F 11/2263 |
| 2022/0405548 A1* | 12/2022 | Oh | G06N 3/049 |
| 2023/0004777 A1* | 1/2023 | Kim | G06N 3/08 |
| 2023/0068675 A1* | 3/2023 | Kim | G06N 3/065 |
| 2023/0186089 A1* | 6/2023 | Schie | G06N 3/048 |
| | | | 706/25 |
| 2023/0259745 A1* | 8/2023 | Oh | G06F 7/58 |
| | | | 706/25 |
| 2023/0385616 A1* | 11/2023 | Oh | G06N 3/063 |
| 2023/0385618 A1* | 11/2023 | Oh | G06N 3/065 |
| 2023/0385620 A1* | 11/2023 | Oh | G06N 3/065 |
| 2024/0378411 A1* | 11/2024 | Oh | G06N 3/065 |
| 2025/0007622 A1* | 1/2025 | Huang | H04B 10/801 |
| 2025/0125809 A1* | 4/2025 | Yang | H03L 7/18 |

* cited by examiner

ENCODER AND OPERATION METHOD THEREOF

CROSS-REFERENCE TO RELATED APPLICATIONS

This application claims priority under 35 U.S.C. § 119 to Korean Patent Application No. 10-2021-0113270 filed on Aug. 26, 2021 and No. 10-2022-0026567 filed on Mar. 2, 2022, in the Korean Intellectual Property Office, the disclosures of which are incorporated by reference herein in their entireties.

BACKGROUND

Embodiments of the present disclosure described herein relate to a neuromorphic system, and more particularly, relate to an encoder that generates an input spike signal for a spike neural network (SNN) and an operating method thereof.

An artificial neural network (ANN) refers to a network in which human thinking, reasoning, or learning processes are implemented with an electronic circuit. The ANN may be implemented by mimicking neurons and synapses in a human body.

An SNN is one of the implementation methods of ANN. The SNN delivers a signal in a form of a pulse or spike, which fires during a short time. Pulse-shaped signals or spike-shaped signals may be generated based on various neural coding schemes such as rate coding, temporal coding, or the like.

SUMMARY

Embodiments of the present disclosure provide an encoder having improved performance and an operating method thereof.

According to an embodiment, an encoder includes an event layer that outputs a first event signal and a second event signal, a weight layer that applies a first weight to the first event signal, applies a second weight to the second event signal, and provides a first node with the first event signal, to which the first weight is applied, and the second event signal, to which the second weight is applied, and a first spike generation circuit that generates a first input spike signal of which a firing period is changed based on a voltage level of the first node. In this case, the voltage level of the first node is reduced continuously, increases by a first voltage corresponding to the first weight when the first event signal, to which the first weight is applied, is activated, and increases by a second voltage corresponding to the second weight when the second weight event signal to which the second weight is applied is activated. When the voltage level of the first node is a first level, a firing period of the first input spike signal is a first time interval. When the voltage level of the first node is a second level lower than the first level, the firing period of the first input spike signal is a second time interval longer than the first time interval.

In an embodiment, when the voltage level of the first node is not greater than a threshold voltage level, the first input spike signal does not fire.

In an embodiment, whether to activate the first event signal is determined based on whether a first event occurs, and whether to activate the second event signal is determined based on whether a second event occurs.

In an embodiment, the first input spike signal includes time-series correlation information between the first event and the second event.

In an embodiment, the encoder further includes a second spike generation circuit that generates a second input spike signal of which a firing period is changed based on a voltage level of a second node. The event layer further outputs a third event signal, whose activation is determined based on whether the first event occurs, and a fourth event signal, whose activation is determined based on whether the second event occurs. The weight layer applies a third weight to the third event signal, applies a fourth weight to the fourth event signal, and provides the second node with the third event signal, to which the third weight is applied, and the fourth event signal, to which the fourth weight is applied. The voltage level of the second node is reduced continuously, increases by a third voltage corresponding to the third weight when the third event signal, to which the third weight is applied, is activated, and increases by a fourth voltage corresponding to the fourth weight when the fourth weight event signal to which the fourth weight is applied is activated.

In an embodiment, the encoder further includes a discharge circuit connected to the first node and for continuously reduces the voltage level of the first node.

In an embodiment, the voltage level of the first node is continuously reduced by charge leakage.

In an embodiment, the encoder further includes a capacitor connected between the first node and a ground voltage.

In an embodiment, the first spike generation circuit includes a voltage controlled oscillator (VCO).

In an embodiment, the first input spike signal is provided to a spike neural network (SNN) circuit.

In an embodiment, the SNN circuit is implemented in a rate-coding method.

According to an embodiment, a method of operating an encoder configured to provide an input spike signal to an SNN includes generating a plurality of event signals, whose activations are determined based on a plurality of events occur, respectively, applying a weight to each of the plurality of event signals, accumulating a voltage at a first node, at which a voltage level is continuously reduced, based on a weight applied to an event signal, which is activated, from among the plurality of event signals, and outputting the input spike signal of which a firing period is changed based on the voltage level of the first node. In this case, the firing period is a first time interval when the voltage level of the first node is a first level, and is a second time interval longer than the first time interval when the voltage level of the first node is a second level lower than the first level.

In an embodiment, when the voltage level of the first node is not greater than a threshold voltage level, the input spike signal does not fire.

In an embodiment, the encoder further includes a discharge circuit implemented to reduce the voltage level of the first node.

In an embodiment, the SNN circuit is implemented in a rate-coding method.

According to an embodiment, a neuromorphic system includes an SNN circuit implemented in a rate-coding method and an encoder that provides an input spike signal to the SNN circuit. The encoder includes a first node and a spike generation circuit configured to generate the input spike signal based on a voltage level of the first node. The voltage level of the first node is continuously reduced, increases by a first voltage when a first event occurs, and increases by a second voltage when a second event occurs.

A firing period of the input spike signal is reduced when the voltage level of the first node increases.

In an embodiment, when the voltage level of the first node is not greater than a threshold voltage level, the input spike signal does not fire.

In an embodiment, the input spike signal includes occurrence timing information about the first event and the second event.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described in detail and clearly to such an extent that an ordinary one in the art easily implements the present disclosure. Specific details such as detailed components and structures are merely provided to assist the overall understanding of the embodiments of the present disclosure. Therefore, it should be apparent to those skilled in the art that various changes and modifications of the embodiments described herein may be made without departing from the scope and spirit of the present disclosure. Moreover, descriptions of well-known functions and structures are omitted for clarity and brevity. In the following drawings or in the detailed description, configurations may be connected with any other components except for components illustrated in a drawing or described in the detailed description. The terms described below are terms defined in consideration of the functions of the present disclosure and are not limited to a specific function. The definitions of the terms should be determined based on the contents throughout the specification.

Components that are described in the detailed description with reference to the terms "driver", "block", etc. will be implemented with software, hardware, or a combination thereof. For example, the software may be a machine code, firmware, an embedded code, and application software. For example, the hardware may include an electrical circuit, an electronic circuit, a processor, a computer, integrated circuit cores, a pressure sensor, a microelectromechanical system (MEMS), a passive element, or a combination thereof.

The present disclosure relates to ANN. A neural network according to an embodiment of the present disclosure may process signals and information in a manner similar to a biological neural network. For example, the neural network of the present disclosure may include configurations corresponding to neurons, synapses, and the like of a biological neural network. Each of the components of the neural network according to an embodiment of the present disclosure may perform a function similar to each of components of the biological neural network.

Hereinafter, an SNN that processes a spike or pulse signal, and an encoder that provides input signals to the SNN will be representatively described. However, the scope of the present disclosure is not limited thereto. For example, the technical spirit of the present disclosure may be similarly applied to various ANNs, such as a perceptron-based neural network, a convolution-based neural network, and the like.

Figure 1:
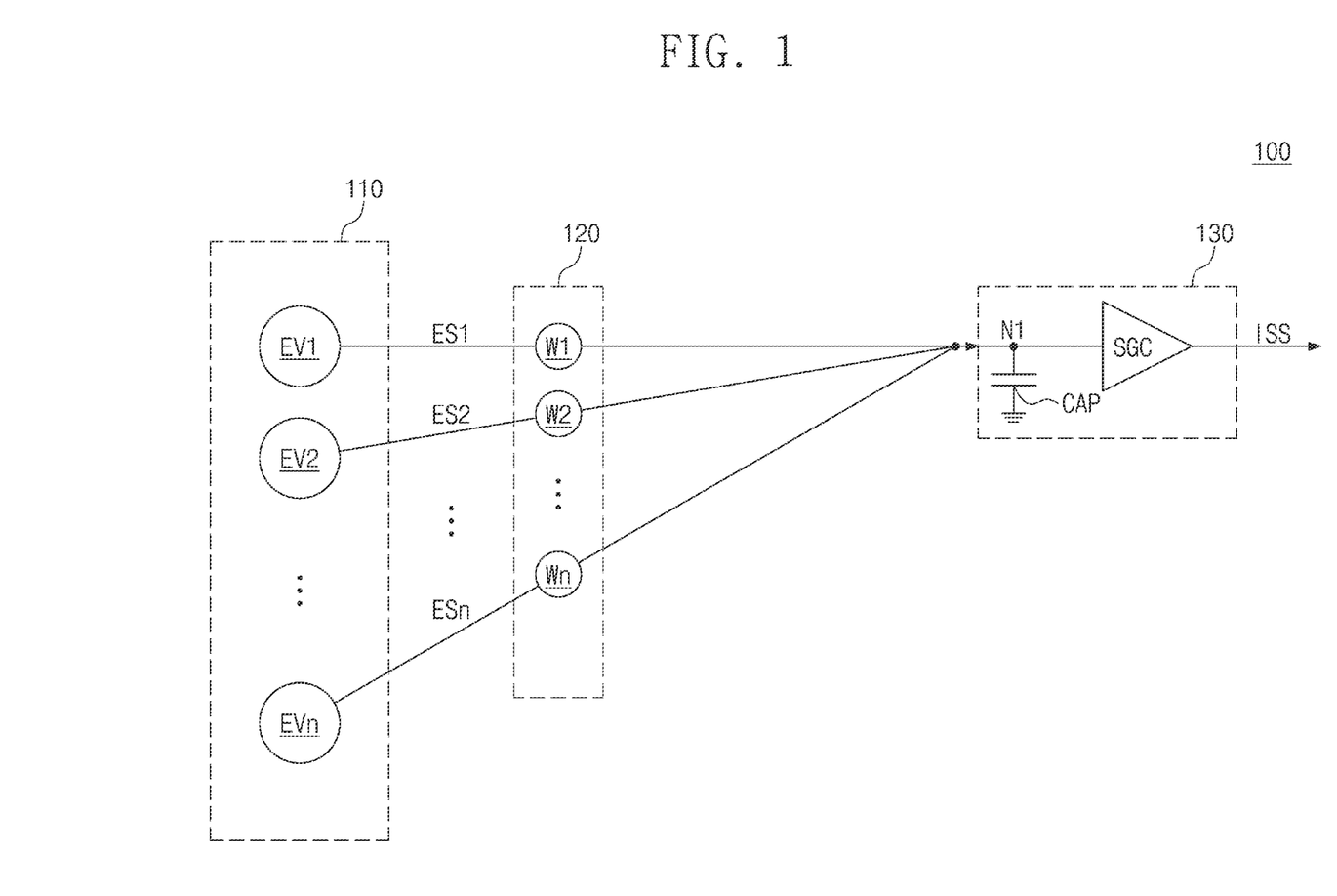
FIG. 1 is a block diagram illustrating an encoder, according to an embodiment of the present disclosure.

FIG. 1 is a block diagram illustrating an encoder, according to an embodiment of the present disclosure. Referring to FIG. 1, the encoder 100 may include an event layer 110, a weight layer 120, and a spike generation unit 130.

The event layer 110 may include first to n-th event circuits EV1 to EVn. The first to n-th event circuits EV1 to EVn may generate first to n-th event signals ES1 to ESn (here, 'n' is an integer greater than or equal to 1), respectively. However, the scope of the present disclosure is not limited thereto, and at least one of the first to n-th event signals ES1 to ESn may be provided from the outside of the encoder 100.

The first to n-th event signals ES1 to ESn may be provided to the spike generation unit 130 via the weight layer 120. Whether the first to n-th event signals ES1 to ESn are activated may be determined based on whether first to n-th events occur, respectively. For example, when the first event occurs, the first event signal ES1 may be activated. When the second event occurs, the second event signal ES2 may be activated.

In an embodiment, the event may mean a change in one of various measurable parameters such as voltage, current, temperature, pressure, light intensity, speed, frequency, wavelength, and the like.

The weight layer 120 may apply weights W1 to Wn to the first to n-th event signals ES1 to ESn, respectively. For example, the weight layer 120 may apply the first weight W1 to the first event signal ES1 and may apply the second weight W2 to the second event signal ES2. The weight layer 120 may provide the first node N1 with the first to n-th event signals ES1 to ESn to which the weights W1 to Wn are respectively applied.

In an embodiment, each of the first to n-th weights W1 to Wn may be determined based on a correlation between first to n-th events. The first to n-th weights W1 to Wn may have levels the same as or different from one another.

A voltage level of the first node N1 may increase in response to the activation of each of the first to n-th event signals ES1 to ESn. The voltage level of the first node N1 may increase by a weight applied to the activated event signal. For example, when the first event signal ES1 is activated, the voltage level of the first node may increase by a voltage (e.g., a first voltage) corresponding to the first weight W1. When the second event signal ES2 is activated, the voltage level of the first node may increase by a voltage (e.g., a second voltage) corresponding to the second weight W2.

The voltage level of the first node N1 may decrease continuously over time. In an embodiment, the voltage level of the first node N1 may be reduced by charge leakage (or leakage current).

In an embodiment, the encoder 100 may further include a discharge circuit (not shown) connected to the first node N1. The discharge circuit may reduce the voltage level of the first node N1. However, the scope of the present disclosure is not limited thereto, and the existency and type of the discharge circuit may be appropriately selected to determine the decrease rate of the voltage level of the first node N1.

The spike generation unit 130 may include a capacitor CAP and a spike generation circuit SGC. The capacitor CAP may be connected between the first node N1 and a ground voltage. The capacitor CAP may be used to store the voltage at the first node N1 or to maintain the voltage level at the first node N1.

The spike generation circuit SGC may output an input spike signal ISS based on the voltage level of the first node N1. The firing frequency or firing period of the input spike signal ISS may be changed based on the voltage level of the first node N1. The relationship between the voltage level of the first node N1 and the firing period of the input spike signal ISS will be described in more detail with reference to FIG. 2A below.

In an embodiment, the spike generation circuit SGC may include a voltage controlled oscillator (VCO).

In an embodiment, when the voltage level of the first node N1 is lower than a threshold voltage level (hereinafter, the threshold voltage level may be referred to as "Vth"), the input spike signal ISS may not fire. That is, when the voltage level of the first node N1 is lower than the threshold voltage level, the input spike signal ISS may have a logic low. Accordingly, the firing timing of the input spike signal ISS may be determined depending on a time-series correlation between timings at which a plurality of events respectively occur. That is, the input spike signal ISS may include information about the time-series correlation between first to n-th events. The correlation between the timing of occurrence of each of a plurality of events and the firing timing of the input spike signal ISS will be described in more detail with reference to the drawings below.

In an embodiment, the input spike signal ISS may be provided to a rate-coding-based SNN circuit (not shown). In this case, the correlation between the plurality of events may be considered even in the rate-coding-based SNN circuit. For example, the correlation between the plurality of events may mean an interval between timings at which a plurality of events occur. Accordingly, according to an embodiment of the present disclosure, information loss occurred when the encoder generates input spike signals may be minimized. Accordingly, according to an embodiment of the present disclosure, a neuromorphic system with improved performance may be provided.

In an embodiment, according to an embodiment of the present disclosure, an input spike signal related to the correlation between the plurality of events may be generated by performing an additional encoding operation on a plurality of events. In this case, the SNN circuit operating based on the input spike signal related to the correlation between the plurality of events may perform a more accurate inference (or determination) operation. For example, a neuromorphic system that operates based on an input spike signal generated through the encoder of the present disclosure may perform an inference operation with high accuracy compared to a neuromorphic system that does not include the encoder of the present disclosure.

In FIG. 1, the one spike generation unit 130 corresponding to the first to n-th events in a many-to-one manner is shown, but the scope of the present disclosure is not limited thereto. For example, an encoder may include two or more spike generation units. In this case, the first to n-th events may correspond to a plurality of spike generation units in a many-to-many manner, and the encoder may generate a plurality of input spike signals. An encoder including a plurality of spike generation units will be described in more detail with reference to FIGS. 4 to 6 below.

Figure 2A:
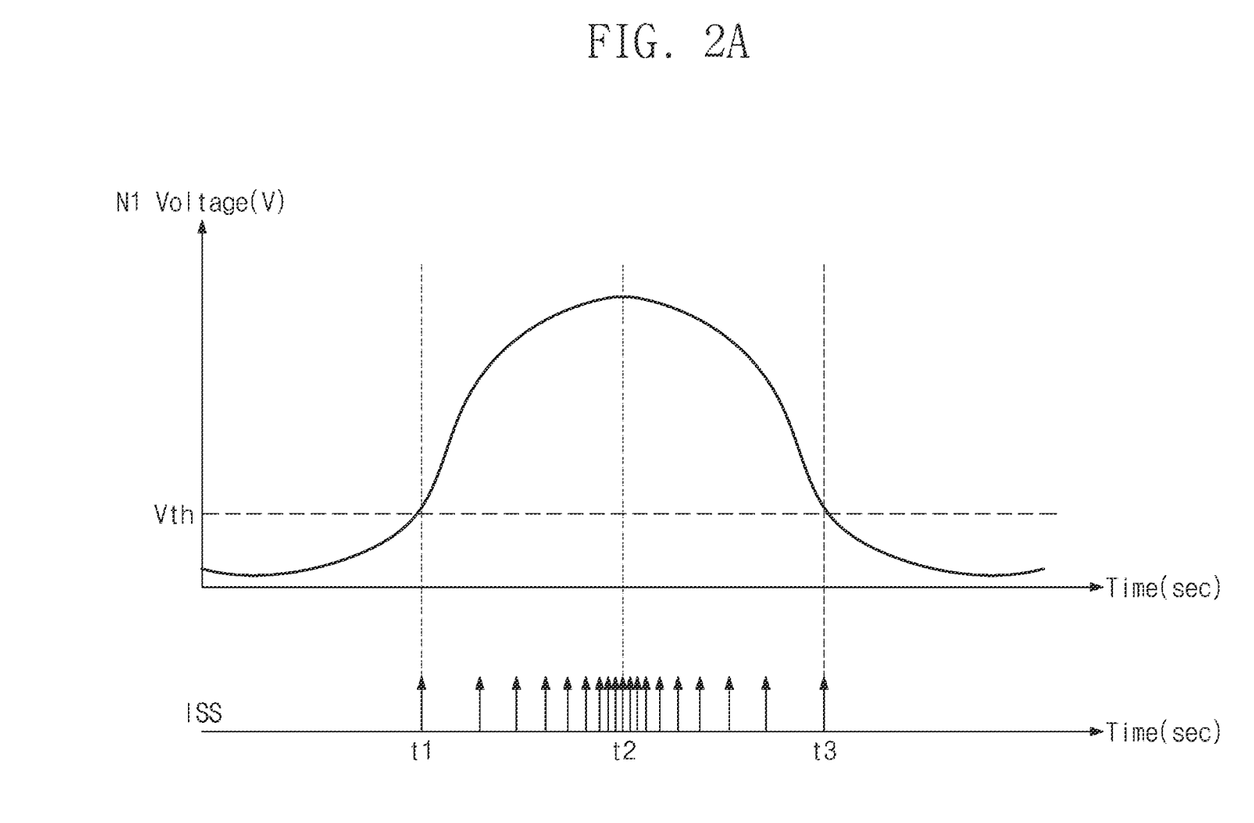
FIGS. 2A to 2C are graphs illustrating the relationship between the first node voltage and the spike generation circuit of FIG. 1.
Figure 2B:
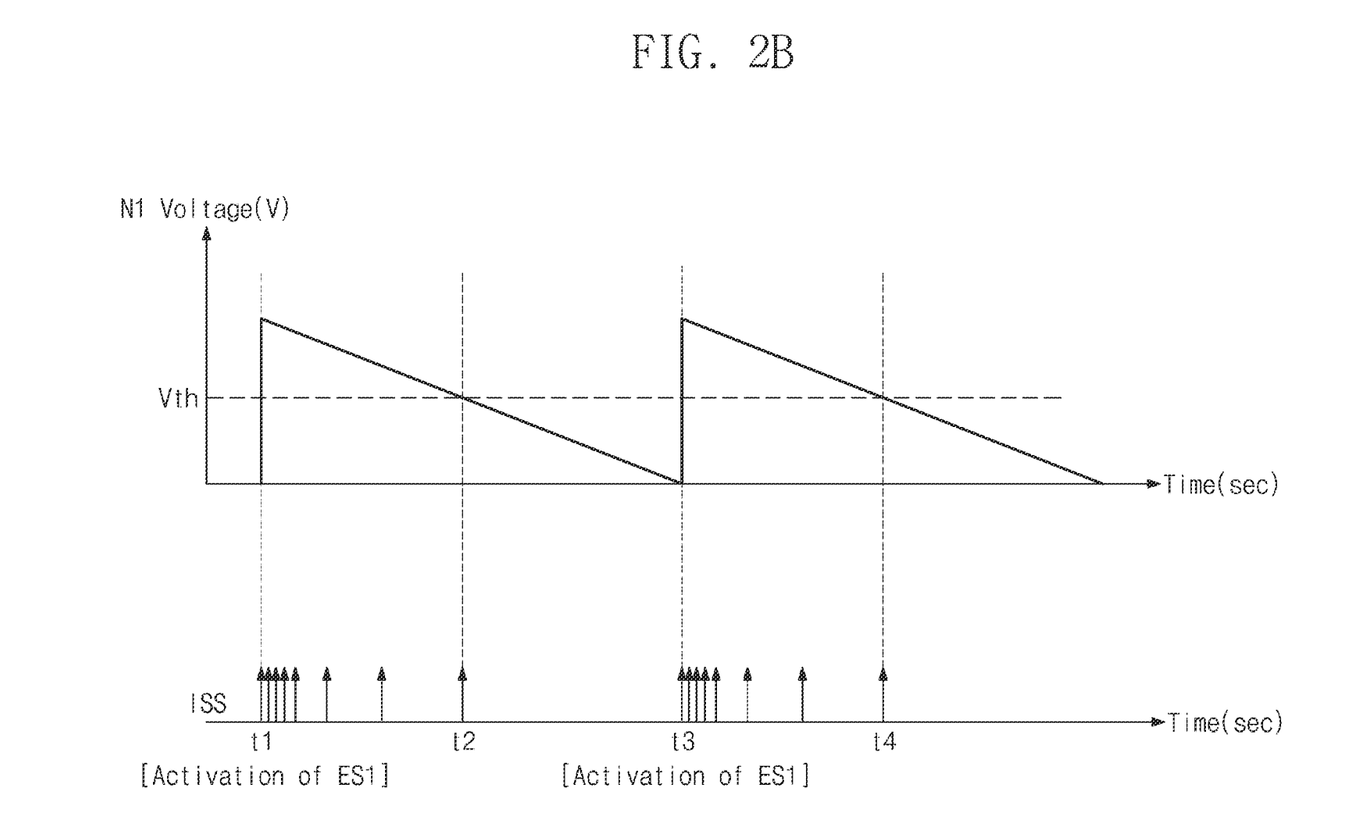
Figure 2C:
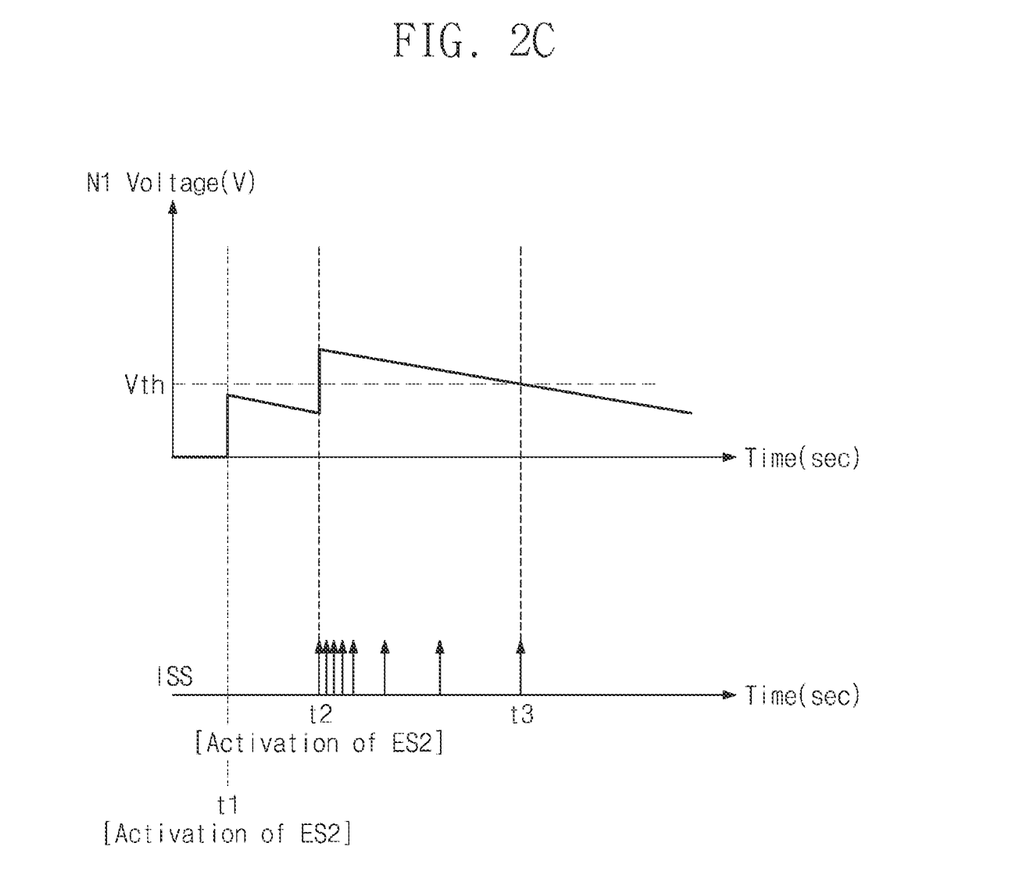

FIGS. 2A to 2C are graphs illustrating the relationship between the first node voltage and the spike generation circuit of FIG. 1. A horizontal axis of FIGS. 2A to 2C represents a time. A vertical axis of FIGS. 2A to 2C represents a voltage.

First of all, referring to FIGS. 1 and 2A, a voltage of the first node N1 may increase or decrease over time. For example, a voltage may be accumulated at the first node N1 (i.e., a voltage level of the first node N1 increases) in response to a fact that each of the first to n-th event signals ES1 to ESn is activated. The voltage level of the first node N1 may be reduced by charge leakage or may be reduced by a discharge circuit.

In an embodiment, whether to fire the input spike signal ISS may be determined according to the voltage level of the first node N1 changes. For example, when the voltage level of the first node N1 is lower than the threshold voltage level Vth, the input spike signal ISS may not fire. Accordingly, in a time period before a first timing t1 and a time period after a third timing t3, the input spike signal ISS may not fire (i.e., it may be a logic low).

The firing period of the input spike signal ISS may be changed depending on the voltage level of the first node N1. For example, when the voltage level of the first node N1 is high at a second timing t2, the input spike signal ISS may fire at a relatively short time interval. When the voltage level of the first node N1 is low at the third timing t3, the input spike signal ISS may fire at a relatively long time interval.

For a more concise description, a part of the firing timing of the input spike signal ISS is shown in FIG. 2A. However, the scope of the present disclosure is not limited to the number of fires of the input spike signal ISS. For example, the scope of the present disclosure may include various embodiments in which a firing period of the input spike signal ISS varies depending on a voltage level of a capacitor.

Referring to FIGS. 1 and 2B, the voltage of the first node N1 may increase in response to activation of the first event signal ES1. For example, the first event signal ES1 may be activated at the first timing t1 and the third timing t3. That is, the voltage of the first node N1 may increase at the first timing t1 and the third timing t3. In this case, the voltage of the first node N1 may increase by a weight (i.e., the first weight W1) applied to the first event signal ES1.

In an embodiment, the level of the first weight W1 may be sufficiently large. For example, even when the first event signal ES1 is activated once, the accumulated voltage level of the first node N1 may increase to the threshold voltage level Vth or more. That is, whenever the first event signal ES1 is activated (e.g., the first timing t1 and the third timing t3), the voltage level of the first node N1 may increase to the threshold voltage level Vth or more. In this case, from a point in time (e.g., the first timing t1 or the third timing t3) when the first event signal ES1 is activated, to a point in time (e.g., the second timing t2 or a fourth timing t4) when the voltage level of the first node N1 decreases to the threshold voltage level Vth or less, the firing period of the input spike signal ISS may be continuously reduced. However, in a time period between the first timing t1 and the second timing t2, and a time period between the third timing t3 and the fourth timing t4, the firing of the input spike signal ISS may occur continuously. In other words, when the voltage of the first node N1 does not decrease to the threshold voltage level Vth or less, the input spike signal ISS may continuously fire even when a firing frequency (or frequency) is reduced.

On the other hand, referring to FIGS. 1 and 2C, the voltage of the first node N1 may increase in response to the activation of the second event signal ES2. For example, the second event signal ES2 may be activated at the first timing t1 and the second timing t2. That is, the voltage of the first node N1 may increase at the first timing t1 and the second timing t2 In this case, the voltage of the first node N1 may be accumulated by a weight (i.e., the second weight W2) applied to the second event signal ES2.

In an embodiment, the level of the second weight W2 may be less than the level of the first weight W1. For example, even when the second event signal ES2 is activated once, the voltage level of the first node N1 may not increase to the threshold voltage level Vth or more.

In an embodiment, the accumulated voltage level of the first node N1 may continuously decrease. Accordingly, only when the second event signal ES2 is activated several times within a specific time interval, the input spike signal ISS may fire. For example, even when the second event signal ES2 is activated at the first timing t1, the input spike signal ISS may not fire, and the input spike signal ISS may start firing at the second timing t2 at which the second event signal ES2 is activated again. The input spike signal ISS may fire until a point in time (e.g., the third timing t3) when the voltage level of the first node N1 is reduced to the threshold voltage level Vth or less.

FIGS. 2B and 2C illustrate that the voltage level of the first node N1 is linearly decreased, but the scope of the present disclosure is not limited thereto. For example, the voltage level of the first node N1 may decrease exponentially.

Figure 3:
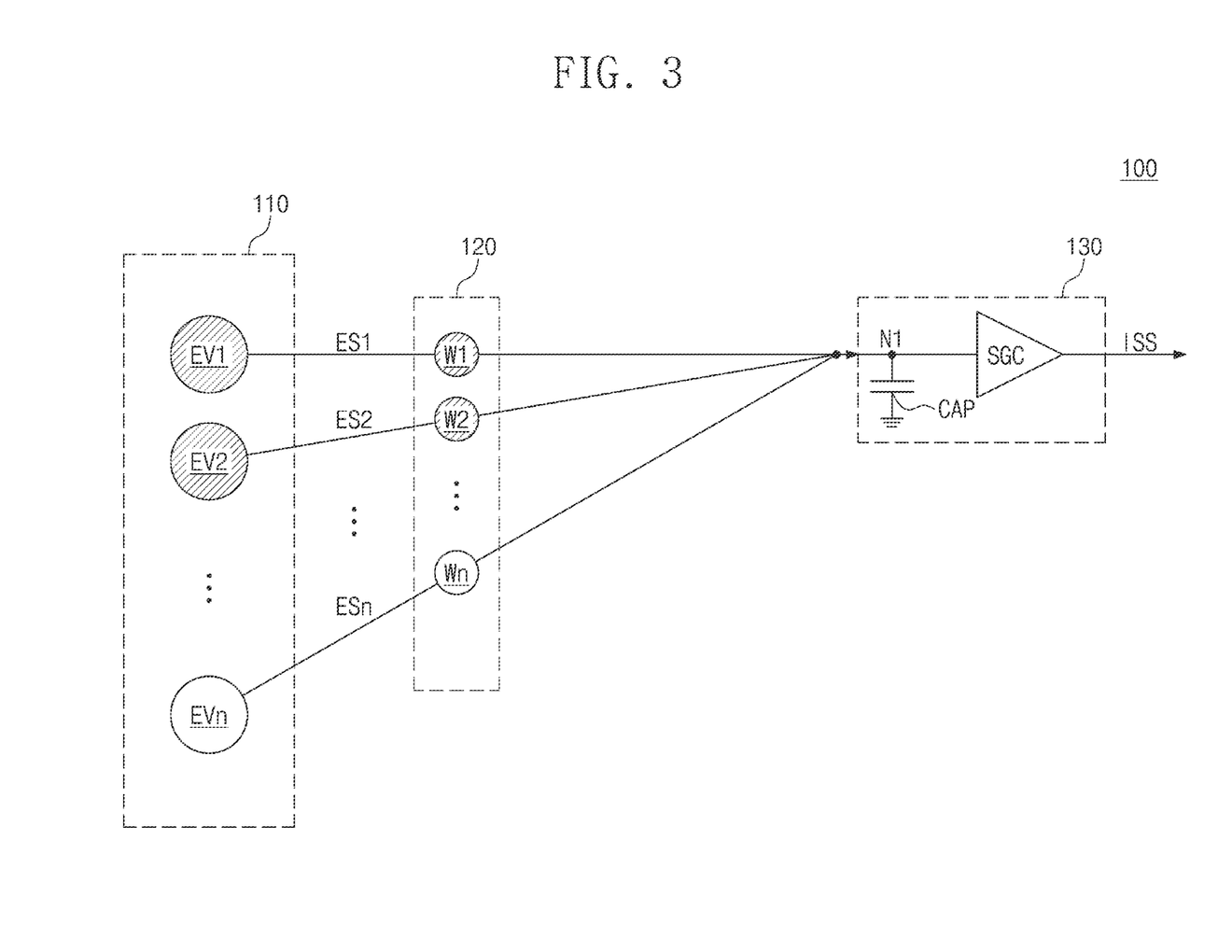
FIG. 3 is a block diagram for describing an operation of the encoder of FIG. 1.

FIG. 3 is a block diagram for describing an operation of the encoder of FIG. 1. Hereinafter, a time-series correlation between first and second events will be described with reference to FIGS. 1 and 3. For convenience of description, detailed descriptions of the event layer 110, the weight layer 120, and the spike generation unit 130 given with reference to FIG. 1 will be omitted to avoid redundancy.

When the first event signal ES1 is activated, a voltage may be accumulated at the first node N1 by the first weight W1. When the voltage level accumulated at the first node N1 does not exceed the threshold voltage level Vth, the input spike signal ISS may not fire.

In an embodiment, when the second event signal ES2 is activated while the voltage is accumulated at the first node N1 by the first weight W1, a voltage may be further accumulated at the first node N1 by the second weight W2. Accordingly, the accumulated voltage level may exceed the threshold voltage level Vth. In this case, the input spike signal ISS may include information indicating that the correlation between the first event and the second event is high. In addition, the input spike signal ISS may include information that the first event and the second event occurred at a short time interval. That is, the input spike signal ISS may include information about the correlation between the first event and the second event.

In an embodiment, even when the second event signal ES2 is activated while a voltage is accumulated at the first node N1 by the first weight W1, the voltage level accumulated at the first node N1 may not exceed the threshold voltage level Vth. In this case, the input spike signal ISS may not fire despite the occurrence of the first event and the second event. That is, the input spike signal ISS may include information indicating that the correlation between the first event and the second event is low.

In an embodiment, the firing frequency of the input spike signal ISS may have a positive correlation with a degree of correlation between a plurality of events.

Figure 4:
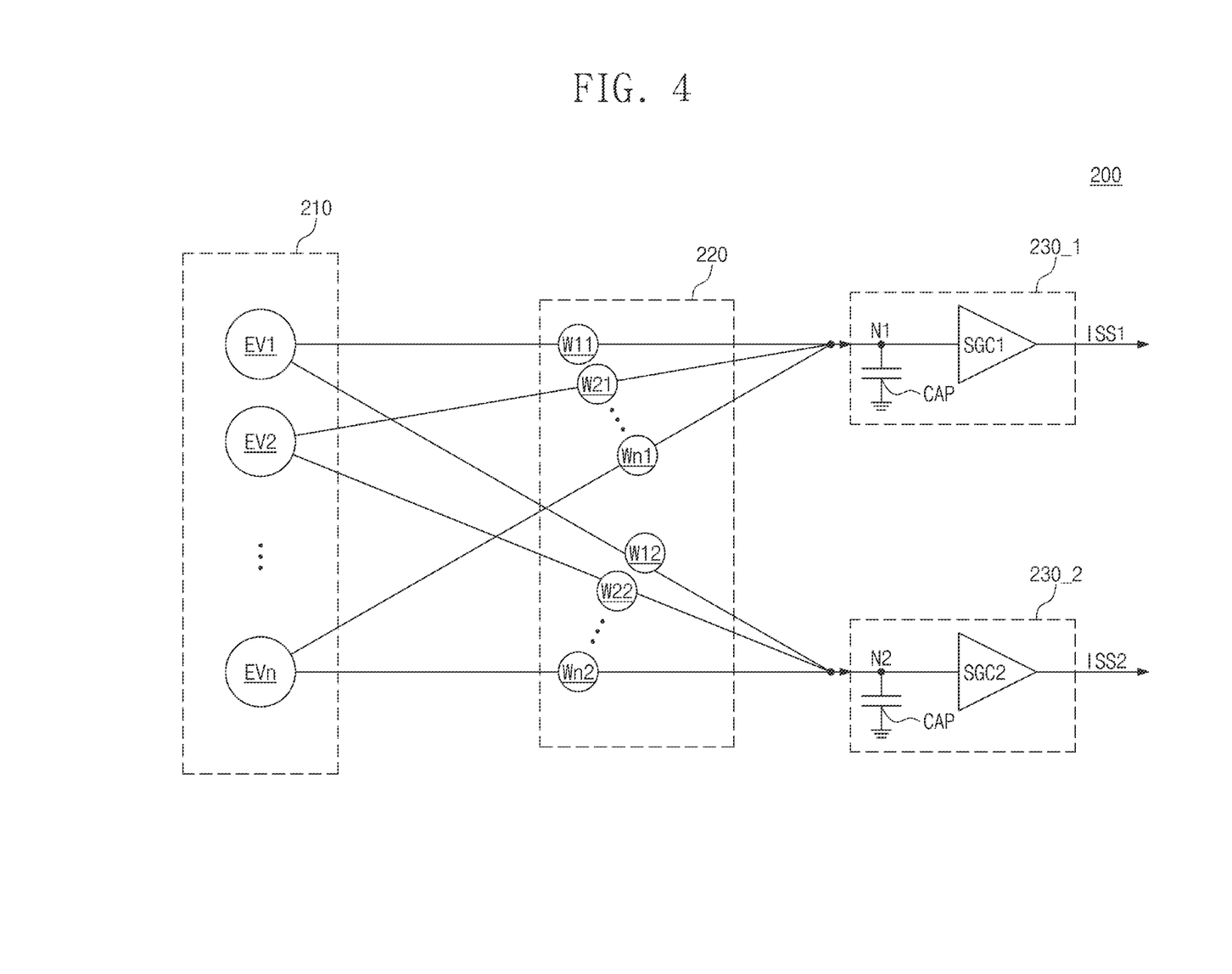
FIG. 4 is a block diagram illustrating an encoder, according to an embodiment of the present disclosure.

FIG. 4 is a block diagram illustrating an encoder, according to an embodiment of the present disclosure. The encoder 200 may include an event layer 210, a weight layer 220, and first and second spike generation units 230_1 and 230_2. Configurations and functions of the event layer 210, the weight layer 220, and the first and second spike generation units 230_1 and 230_2 are similar to the configurations and functions of the event layer 110, the weight layer 120, and the spike generation unit 130 described with reference to FIG. 1, and thus a detailed description is omitted to avoid redundancy.

Each of the first to n-th event circuits EV1 to EVn may output an event signal provided to the first spike generation unit 230_1 via the weight layer 120. In addition, each of the first to n-th event circuits EV1 to EVn may output the event signal provided to the second spike generation unit 230_2 via the weight layer 120.

Hereinafter, a weight applied to an event signal, which is output from the first event circuit EV1 and provided to the first spike generation unit 230_1, may be referred to as "W11", and a weight applied to an event signal, which is output from the second event circuit EV2 and provided to the first spike generation unit 230_1, may be referred to as "W21". A weight applied to an event signal, which is output from the n-th event circuit EVn and provided to the first spike generation unit 230_1, may be referred to as "Wn1".

Similarly, a weight applied to an event signal, which is output from the first event circuit EV1 and provided to the second spike generation unit 230_2, may be referred to as "W12", and a weight applied to an event signal, which is output from the second event circuit EV2 and provided to the second spike generation unit 230_2, may be referred to as "W22". A weight applied to an event signal, which is output from the n-th event circuit EVn and provided to the second spike generation unit 230_2, may be referred to as "Wn2".

In an embodiment, weights applied to event signals provided to the first spike generation unit 230_1 and the second spike generation unit 230_2 may be different from one another. For example, weights (i.e., W11 and W12) applied to the event signals output by the first event circuit EV1 to the first spike generation unit 230_1 and the second spike generation unit 230_2 may be different from each other.

The first spike generation unit 230_1 may include the capacitor CAP and a first spike generation circuit SGC1. The first spike generation circuit SGC1 may generate a first input spike signal ISS1 of which a firing period changes in response to the voltage of the first node N1. The second spike generation unit 230_2 may include the capacitor CAP and a second spike generation circuit SGC2. The second spike generation circuit SGC2 may generate a second input spike signal ISS2 of which a firing period changes in response to the voltage of a second node N2. The first input spike signal ISS1 and the second input spike signal ISS2 may be provided to an SNN circuit (not shown). In an embodiment, the first input spike signal ISS1 and the second input spike signal ISS2 may be provided to different neuron circuits of one input neuron layer of the SNN circuit, respectively.

Figure 5:
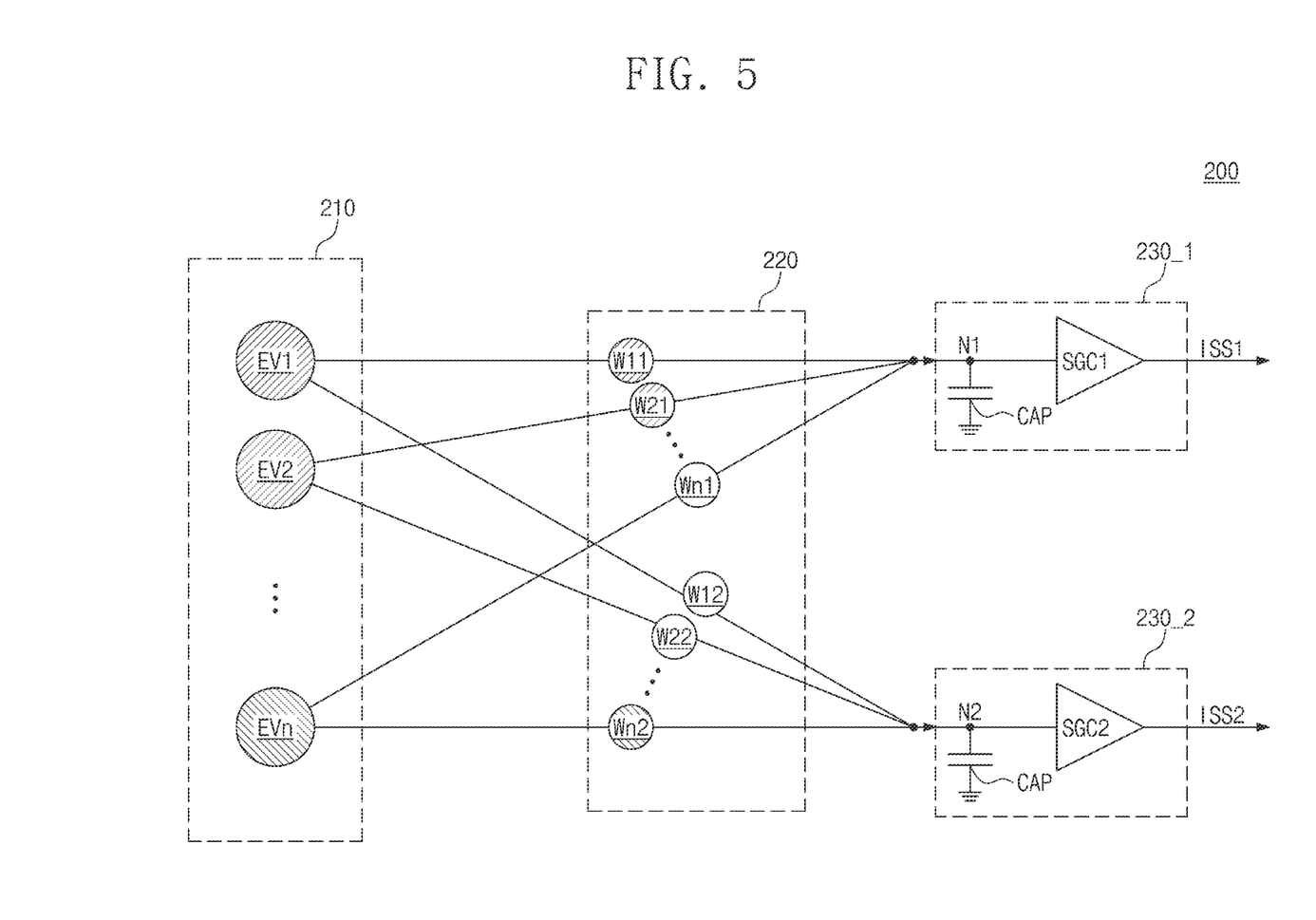
FIG. 5 is a block diagram for describing an operation of the encoder of FIG. 4.

FIG. 5 is a block diagram for describing an operation of the encoder of FIG. 4. Hereinafter, a relationship between the first input spike signal ISS1 and the second input spike signal ISS2 will be described with reference to FIGS. 1, 4 and 5.

When a first event occurs, a voltage corresponding to W11 may be accumulated at the first node N1. When a second event occurs, a voltage corresponding to W21 may be accumulated at the first node N1. In this case, when a voltage level accumulated at the first node N1 exceeds the threshold voltage level Vth, the first input spike signal ISS1 may fire.

In an embodiment, when the first input spike signal ISS1 fires, a n-th event may further occur. A voltage corresponding to the level of Wn2 may be accumulated at the second node N2 in response to the occurrence of the n-th event. When a voltage level accumulated at the second node N2 exceeds the threshold voltage level Vth, the second input spike signal ISS2 may fire. In this case, when the level of Wn2 is greater than the level of W11 or the level of W21, the firing period of the second input spike signal ISS2 may be shorter than the firing period of the first input spike signal ISS1. Accordingly, before the n-th event occurs, the influence of an SNN (not shown) of the first input spike signal ISS1 may be dominant. After the n-th event occurs, the influence of the second input spike signal ISS2 on the SNN (not shown) may be dominant.

In an embodiment, when the first input spike signal ISS1 fires, the n-th event that has no correlation between the first event and the second event may further occur. In this case, even when the n-th events further occur, the firing period of the first input spike signal ISS1 may not change. For example, a value of Wn1 may be 0.

Figure 6:
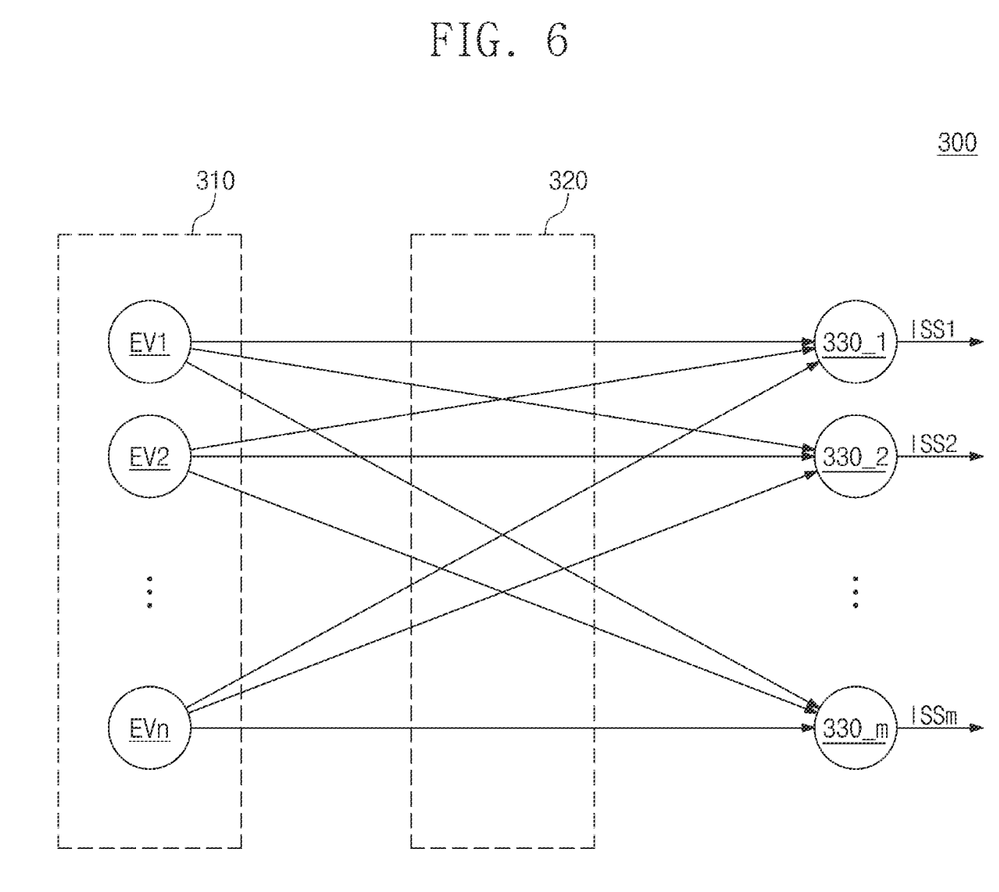
FIG. 6 is a block diagram illustrating an encoder, according to an embodiment of the present disclosure.

FIG. 6 is a block diagram illustrating an encoder, according to an embodiment of the present disclosure. An encoder 300 may include an event layer 310, a weight layer 320, and first to m-th spike generation units 330_1 to 330_m.

The event layer 310 may include first to n-th event circuits EV1 to EVn. The first event circuit EV1 may output event signals provided to the first to m-th spike generation units 330_1 to 330_m via the weight layer 320. The second event circuit EV2 may output event signals provided to the first to m-th spike generation units 330_1 to 330_m via the weight layer 320. Similarly, the n-th event circuit EVn may output event signals provided to the first to m-th spike generation units 330_1 to 330_m via the weight layer 320.

The weight layer 320 may apply weights to event signals output from the first to n-th event circuits EV1 to EVn. The weight layer 320 may provide the first to m-th spike generation units 330_1 to 330_m with event signals, to which weights are respectively applied.

The first to m-th spike generation units 330_1 to 330_m may output first to m-th input spike signals ISS1 to ISSm, respectively. In an embodiment, the first to m-th input spike signals ISS1 to ISSm may be provided to different neuron circuits of one input neuron layer of the SNN circuit.

Configurations and functions of the event layer 310, the weight layer 320, and the first to m-th spike generation units 330_1 to 330_m are similar to those described with reference to FIGS. 1 and 4, and thus detailed descriptions are omitted to avoid redundancy.

Figure 7:
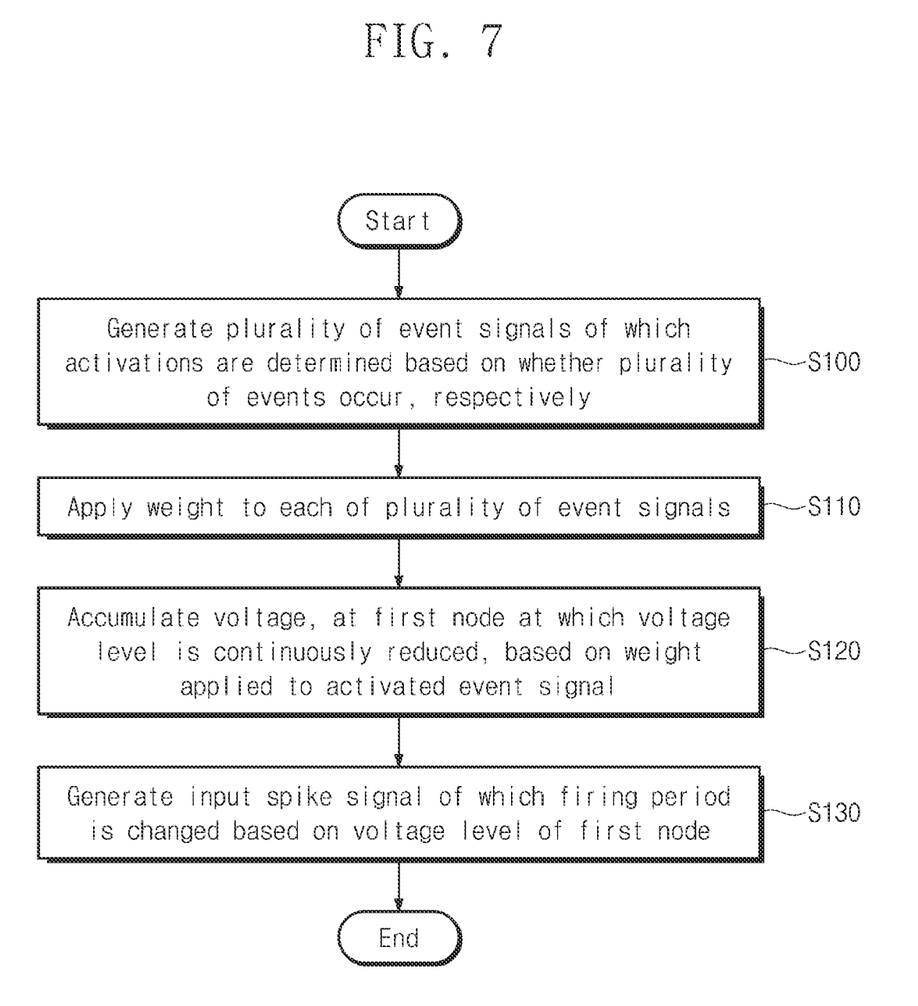
FIG. 7 is a flowchart illustrating a method of operating an encoder, according to an embodiment of the present disclosure.

FIG. 7 is a flowchart illustrating a method of operating an encoder, according to an embodiment of the present disclosure. Referring to FIGS. 1 and 7, in operation S100, the encoder 100 may generate a plurality of event signals of which activations are determined respectively based on whether a plurality of events have occurred. For example, the first to n-th event circuits EV1 to EVn may generate the first to n-th event signals ES1 to ESn, respectively. Whether the first to n-th event signals ES1 to ESn are activated may be determined based on whether the first to n-th event occurs, respectively.

In operation S110, the encoder 100 may apply a weight to each of the plurality of event signals. For example, the encoder 100 may apply the first to n-th weights W1 to Wn to the first to n-th event signals ES1 to ESn through the weight layer 120, respectively. The weight layer 120 may deliver the first to n-th event signals ES1 to ESn, in which the first to n-th weights W1 to Wn are respectively applied, to the first node N1.

In operation S120, the encoder 100 may accumulate a voltage based on a weight applied to the activated event signal. For example, the encoder 100 may accumulate a voltage at the first node N1, which voltage level is continuously decreased, based on a weight corresponding to an event signal, which is activated, from among the first to n-th event signals ES1 to ESn. That is, when the first event signal ES1 is activated in response to the occurrence of the first event, the encoder 100 may accumulate a voltage corresponding to the first weight W1 at the first node N1.

In operation S130, the encoder 100 may output the input spike signal ISS of which the firing period is changed based on the level of the accumulated voltage. For example, the spike generation circuit SGC may generate the input spike signal ISS based on the voltage level of the first node N1. The firing period of the input spike signal ISS may be changed based on the voltage level of the first node N1.

In an embodiment, when the voltage level accumulated at the first node N1 is lower than the threshold voltage level Vth, the input spike signal ISS may not fire.

In an embodiment, the voltage level of the first node N1 may be continuously reduced. For example, the voltage level of the first node N1 may continuously decrease due to charge leakage. The voltage level of the first node N1 may be continuously reduced by a discharge circuit connected to the first node.

In an embodiment, as the voltage level accumulated at the first node N1 is high, the firing period of the input spike signal ISS may be shortened.

In an embodiment, an input spike signal related to the correlation between the plurality of events may be generated as an encoder of the present disclosure performs an additional encoding operation on a plurality of events. Accordingly, the SNN circuit operating based on the input spike signal related to the correlation between the plurality of events may perform a more accurate inference operation.

Figure 8:
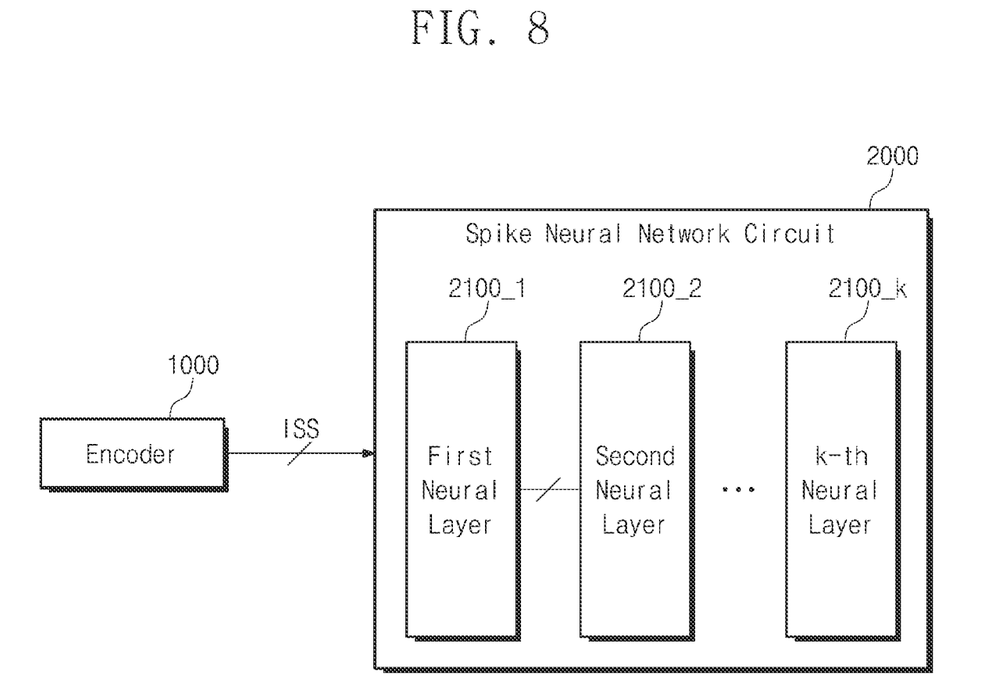
FIG. 8 is a block diagram illustrating a neuromorphic system including an encoder, according to an embodiment of the present disclosure.

FIG. 8 is a block diagram illustrating a neuromorphic system including an encoder, according to an embodiment of the present disclosure. Referring to FIG. 8, a neuromorphic system may include an encoder 1000 and an SNN circuit 2000.

The encoder 1000 may output a plurality of input spike signals ISS to the SNN circuit 2000. In an embodiment, the encoder 1000 may be implemented in a method the same as or similar to a method in which the encoder 100, the encoder 200, and the encoder 300 described with reference to FIGS. 1 to 7 are implemented.

In an embodiment, the neuromorphic system including an encoder according to an embodiment of the present disclosure may perform an inference operation with high accuracy compared to a neuromorphic system that does not include the encoder of the present disclosure. For example, in a neuromorphic system including the encoder of the present disclosure, the SNN may generate an input spike signal based on the relationship between a plurality of events, and may operate based on the generated input spike signal, thereby improving inference accuracy.

The SNN circuit 2000 may include a plurality of neuron layers 2100_1 to 2100_k. Each of the plurality of neuron layers 2100_1 to 2100_k may include a plurality of neuron circuits (not shown). Each of a plurality of neuron circuits may receive a spike signal.

Each of a plurality of neuron circuits may generate an output spike signal in response to the received spike signal. For example, a plurality of neuron circuits of the first neuron layer 2100_1 may receive a plurality of input spike signals ISS, respectively. Each of the plurality of neuron circuits of the first neuron layer 2100_1 may provide an output spike signal to the second neuron layer 2100_2 in response to the received input spike signal.

In an embodiment, the SNN circuit 2000 may be implemented in a rate-coding or temporal-coding method. The SNN circuit 2000 implemented in the rate-coding method may process information based on the firing rate of the spike signal. The SNN circuit 2000 implemented in the temporal-coding method may be configured to process information based on the spike timing of spike signals (including the firing timing and firing interval of spike signals). However, according to the encoder of the embodiment of the present disclosure, information processing based on the spike timing of spike signals may be performed in the SNN circuit 2000 implemented in the rate-coding method. Accordingly, according to an embodiment of the present disclosure, a correlation between a plurality of events may be learned and inferred through the SNN circuit 2000 implemented in a rate-coding method.

The above description refers to embodiments for implementing the present disclosure. Embodiments in which a design is changed simply or which are easily changed may be included in the present disclosure as well as an embodiment described above. In addition, technologies that are easily changed and implemented by using the above embodiments may be included in the present disclosure. Accordingly, it will be apparent to those of ordinary skill in the art that various changes and modifications may be made to the above embodiments without departing from the spirit and scope of the present disclosure as set forth in the following claims.

According to an embodiment of the present disclosure, it is possible to provide an encoder generating input spike signals, to which a time-series correlation between a plurality of events is reflected, and an operating method thereof. According to an embodiment of the present disclosure, the operating efficiency of an SNN circuit may be improved. For example, the accuracy of an inference (or determination) operation of the SNN circuit operating based on an input spike signal may be improved.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An encoder comprising:
   an event layer configured to output a first event signal and a second event signal;
   a weight layer configured to apply a first weight to the first event signal, to apply a second weight to the second event signal, and to provide the first event signal in which the first weight is applied and the second event signal in which the second weight is applied to a first node; and
   a first spike generation circuit configured to generate a first input spike signal of which a firing period is changed based on a voltage level of the first node,
   wherein the voltage level of the first node is reduced continuously, increases for a first voltage corresponding to the first weight in response to the first event signal activated, and increases for a second voltage corresponding to the second weight in response to the second event signal activated,
   wherein, when the voltage level of the first node is a first level, a firing period of the first input spike signal is a first time interval, and
   wherein, when the voltage level of the first node is a second level lower than the first level, the firing period of the first input spike signal is a second time interval longer than the first time interval.

2. The encoder of claim 1, wherein, when the voltage level of the first node is not greater than a threshold voltage level, the first input spike signal does not fire.

3. The encoder of claim 1, wherein, whether to activate the first event signal is determined based on whether a first event occurs, and
   wherein whether to activate the second event signal is determined based on whether a second event occurs.

4. The encoder of claim 3, wherein the first input spike signal includes time-series correlation information between the first event and the second event.

5. The encoder of claim 3, further comprising:
   a second spike generation circuit configured to generate a second input spike signal of which a firing period is changed based on a voltage level of a second node,
   wherein the event layer further outputs a third event signal, whose activation is determined based on whether the first event occurs, and a fourth event signal, whose activation is determined based on whether the second event occurs,
   wherein the weight layer applies a third weight to the third event signal, applies a fourth weight to the fourth event signal, and provides the third event signal in which the third weight is applied and the fourth event signal in which the fourth weight is applied to the second node, and
   wherein the voltage level of the second node is reduced continuously, increases for a third voltage corresponding to the third weight in response to the third event signal activated, and increases for a fourth voltage corresponding to the fourth weight in response to the fourth event signal activated.

6. The encoder of claim 1, further comprising:
   a discharge circuit connected to the first node and configured to continuously reduce the voltage level of the first node.

7. The encoder of claim 1, wherein the voltage level of the first node is continuously reduced by charge leakage.

8. The encoder of claim 1, further comprising:
   a capacitor connected between the first node and a ground voltage.

9. The encoder of claim 1, wherein the first spike generation circuit includes a voltage controlled oscillator (VCO).

10. The encoder of claim 1, wherein the first input spike signal is provided to a spike neural network (SNN) circuit.

11. The encoder of claim 10, wherein the SNN circuit is implemented by a rate-coding method.

12. A method of operating an encoder configured to provide an input spike signal to an spike neural network (SNN) circuit, the method comprising:
generating a plurality of event signals, whose activations are determined based on a plurality of events occur, respectively;
applying a weight to each of the plurality of event signals;
accumulating a voltage at a first node, at which a voltage level is continuously reduced, based on a weight applied to an activated event signal from among the plurality of event signals; and
outputting the input spike signal of which a firing period is changed based on the voltage level of the first node,
wherein the firing period is a first time interval when the voltage level of the first node is a first level, and is a second time interval longer than the first time interval when the voltage level of the first node is a second level lower than the first level.

13. The method of claim 12, wherein, when the voltage level of the first node is not greater than a threshold voltage level, the input spike signal does not fire.

14. The method of claim 12, wherein the encoder further includes:
a discharge circuit implemented to reduce the voltage level of the first node.

15. The method of claim 12, wherein the SNN circuit is implemented in a rate-coding method.

16. A neuromorphic system comprising:
an spike neural network (SNN) circuit implemented by a rate-coding method; and
an encoder configured to provide an input spike signal to the SNN circuit,
wherein the encoder includes a first node, and includes a spike generation circuit configured to generate the input spike signal based on a voltage level of the first node,
wherein the voltage level of the first node is continuously reduced, increases by a first voltage when a first event occurs, and increases by a second voltage when a second event occurs, and
wherein a firing period of the input spike signal is reduced when the voltage level of the first node increases.

17. The neuromorphic system of claim 16, wherein the encoder further includes a discharge circuit connected to the first node and configured to reduce the voltage level of the first node.

18. The neuromorphic system of claim 16, wherein, when the voltage level of the first node is not greater than a threshold voltage level, the input spike signal does not fire.

19. The neuromorphic system of claim 16, wherein the input spike signal includes occurrence timing information about the first event and the second event.

* * * * *